United States Patent [19]
Balcarek et al.

[11] Patent Number: 5,974,893
[45] Date of Patent: Nov. 2, 1999

[54] COMBINED PRESSURE RESPONSIVE TRANSDUCER AND TEMPERATURE SENSOR APPARATUS

[75] Inventors: Richard L. Balcarek, South Easton; Keith D. St. Pierre, Somerset; Douglas B. Strott, Attleboro, all of Mass.

[73] Assignee: Texas Instruments Incorporated, Dallas, Tex.

[21] Appl. No.: 09/079,626

[22] Filed: May 15, 1998

Related U.S. Application Data

[60] Provisional application No. 60/053,674, Jul. 24, 1997.

[51] Int. Cl.$^6$ ...................................................... G01L 7/00
[52] U.S. Cl. .................................................................. 73/714
[58] Field of Search ........................... 73/708, 714, 718, 73/724; 361/283.4

[56] References Cited

U.S. PATENT DOCUMENTS

| | | | |
|---|---|---|---|
| 4,716,492 | 12/1987 | Charboneau et al. | 361/283.4 |
| 4,982,351 | 1/1991 | Kawate et al. | 73/718 |
| 5,436,795 | 7/1995 | Bishop et al. | 73/724 |
| 5,486,976 | 1/1996 | Charboneau et al. | 361/283.4 |
| 5,499,158 | 3/1996 | Bishop et al. | 361/283.4 |

*Primary Examiner*—William Oen
*Attorney, Agent, or Firm*—Russell E. Baumann; Richard L. Donaldson

[57] ABSTRACT

A combined fluid pressure and temperature sensor device 10 has a variable capacitor (14) formed of a rigid substrate (14a) and flexible diaphragm (14b) attached thereto in sealed, spaced apart relation by an annular glass seal (34). The capacitor is received in a fluid passage chamber (12e) of a housing (12) having a fluid port (12b) for coupling to a fluid pressure source to be monitored. A connector (20) mounting transducer terminal pins is received in an open end of the housing with an electric circuit chamber (20d) formed between the connector and the variable capacitor which receives signal conditioning circuitry (26). A temperature responsive thermistor (32) is disposed, in one embodiment, on the exposed face of the diaphragm and is provided with electrical traces (32a, 32b) which go through apertures 14k, 14j) in the diaphragm into electrical contact with connection pads on the substrate within a glass enclosed window (34k, 34j). Traces (32e, 32f) extend from the connection pads through the glass seal to additional glass enclosed windows (34g, 34h) for connection with respective pins (30d, 30e) extending through the substrate to form a hermetic seal between the thermistor (32) and the signal conditioning circuit chamber through the annular glass seal. Additional embodiments include a leaded thermistor (42) positioned in the fluid pressure port (40), a leaded thermistor in a protective sleeve adapted to project into a fluid body (50), a leaded thermistor in which the leads are bent to place the thermistor adjacent to the diaphragm (60), a thermistor mounted on a heat conductive probe with a thermistor proximate to the diaphragm and with the probe extending therebeyond (70) a thermistor received on the substrate through an aperture in the diaphragm in a closed glass window (80) and a thermistor combined with a monolithic variable capacitor (90).

22 Claims, 9 Drawing Sheets

COMBINED PRESSURE RESPONSIVE TRANSDUCER AND TEMPERATURE SENSOR APPARATUS

This application claims priority under 35 USC Section 119 (e) (1) of provisional application Ser. No. 60/053,674 filed Jul. 24, 1997.

BACKGROUND OF THE INVENTION

This application relates generally to condition responsive sensors and more particularly to combined fluid pressure and temperature sensor apparatus.

Fluid pressure responsive capacitive transducers comprising a variable capacitor mounted in a fluid chamber having a thin ceramic diaphragm exposed to the fluid so that changes in fluid pressure cause concomitant changes in the position of the diaphragm to thereby cause a change in the capacitance of the capacitor are well known in the art. Transducers of this type are shown and described, for example, in U.S. Pat. No. 4,716,492, the subject matter of which is incorporated herein by this reference. In that patent, a thin ceramic diaphragm is shown mounted in closely spaced, sealed, overlying relation to a ceramic substrate. Metal coatings are deposited on opposing surfaces of the diaphragm and base to serve as capacitive plates arranged in predetermined closely spaced relation to each other to form a capacitor. Capacitor terminal pins having one end connected to the capacitor plates are mounted in bores extending through the substrate with an opposite end connected to signal conditioning circuitry disposed in an electric circuit chamber at an opposite surface of the substrate. A connector body of electrical insulating material, received over the signal conditioning circuitry, mounts transducer terminals extending into the electric circuit chamber for connection to the signal conditioning circuitry. Capacitance is converted by the circuitry to an output voltage related to the fluid pressure. The capacitor is received in a suitable housing having a fluid receiving port and is provided with a fluid seal enabling the transducer to be used with fluid pressures up to 10,000 psi or higher.

In certain applications it is desirable to measure the temperature of fluid as well as pressure. Although it is known to provide temperature sensors in a separate or stand alone housing, it would be desirable to combine both functions in the same housing so that both measurements can be obtained at essentially the same location as well as to provide savings of cost and space. One of the problems in providing a device combining both functions is that of providing a seal between the electrical leads of the temperature sensing element and the interconnection with the electrical circuit means of the device in order to prevent leakage of the fluid being sensed, particularly at relatively high pressures, while still being able to accurately sense the temperature of the fluid within a satisfactory response time and without impairing the pressure sensing function. Sealing the temperature sensor by overmolding techniques addresses the leakage problem; however, it results in a relatively slow response time and an inherent temperature gradient between the medium being sensed and the sensing element. Sensors which are directly exposed to the fluid medium generally have an epoxy seal for the sensor leads; however, due to leakage problems, these are limited to use with relatively low pressure fluid systems.

SUMMARY OF THE INVENTION

It is an object of the present invention to provide combined pressure and temperature sensor apparatus which overcomes the prior art limitations noted above. Another object is the provision of a combined fluid pressure responsive capacitive transducer and a temperature sensor having a novel fluid seal for the leads of the temperature sensor which do not adversely affect the pressure sensing function of the combined device. Yet another object is the provision of a relatively inexpensive device for measuring both pressure and temperature of a fluid with a high degree of accuracy and a short response time.

Briefly stated, in accordance with the invention, a combined pressure responsive transducer and temperature sensor comprise a housing having a fluid pressure receiving port in fluid communication with a fluid pressure chamber. A variable capacitor having a rigid substrate and a flexible diaphragm are each provided with a capacitor plate on a respective face surface with the diaphragm attached to and spaced from the substrate and with the capacitor plates facing one another in aligned spaced apart relation in a gap formed by a generally annular glass seal. The variable capacitor is disposed in the housing with the diaphragm exposed to the fluid pressure chamber. Electrical traces extend from the capacitor plates into an enclosed window or opening in the glass seal for electrical connection with electrical pins extending through the substrate. The opposite ends of the electrical pins are connected to signal conditioning circuitry disposed in an electric circuit chamber formed between the substrate and an electrical connector body which mounts transducer terminals also connected to the signal conditioning circuitry. A temperature responsive element is mounted preferably for direct engagement with the fluid being monitored and is provided with electrical leads which extend through an opening in the diaphragm near its outer periphery aligned with the glass seal. According to a feature of the invention, the electrical leads are connected to first connection pads in enclosed windows in the glass seal which in turn have traces extending through the glass seal to respective second connection pads in other enclosed windows in the glass seal thereby forming a hermetic seal between the first and second connection pads. Temperature sensor electric pins, connectable to the signal conditioning circuitry, extend through the substrate and are electrically connected to the respective second connection pads. According to a first embodiment, the temperature responsive element, e.g., a resistive element, is a thick film thermistor coated onto the exposed face of the diaphragm. According to another embodiment, the temperature responsive element comprises a pill type of thermistor with wire leads connected to spaced apart portions of the thermistor with the leads extending through respective openings in the diaphragm at a location aligned with enclosed windows of the seal and preferably into closed ended bores in the substrate to provide mechanical support for the leads. The thermistor may be disposed within the port of the housing or it may extend beyond the port with or without a protective sheath. The thermistor leads may also be bent so that the thermistor is placed within the fluid chamber closely adjacent to the diaphragm. According to an alternative embodiment, the sensor is mounted on a heat conductive probe which extends beyond the location of the sensor into the fluid medium. In yet another embodiment, the thermistor, either thick film or surface mount type, may be mounted directly on the substrate through an opening in the diaphragm within a closed opening of the seal, i.e., closed in directions along a transversely extending plane but open in a direction perpendicular to the plane. In another embodiment the temperature sensor is shown combined with a monolithic variable capacitor.

BRIEF DESCRIPTION OF THE DRAWINGS

Other objects, advantages and details of the novel and improved combined pressure and temperature sensor apparatus of this invention appear in the following detailed description of preferred embodiments of the invention, the detailed description referring to the drawings in which.

DETAILED DESCRIPTION OF PREFERRED EMBODIMENTS

Figure 1:
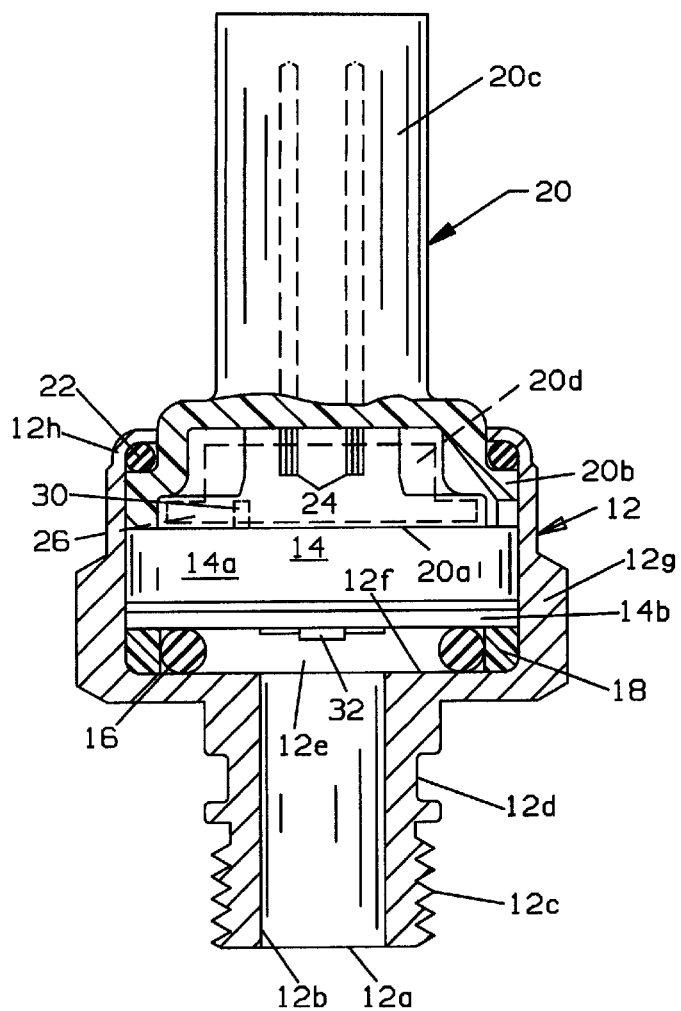
FIG. 1 is a vertical cross sectional view of a combined pressure and temperature sensor device made in accordance with the invention taken along the longitudinal axis thereof.

Referring to FIGS. 1–6, a combined pressure and temperature sensor device 10 made in accordance with the invention comprises a housing 12 formed of suitable metallic material, such as zinc coated steel, having a first end 12a formed with a fluid receiving port 12b. A threaded portion 12c is provided for coupling in a fluid pressure line to be monitored (not shown). An annular groove 12d is formed adjacent to the threaded portion for reception of a suitable o-ring seal (not shown) or the like. Sidewall 12g may be formed with a hexagonal outer configuration to facilitate installation and removal of the housing from a fluid medium coupling. A fluid pressure chamber 12e is formed in housing 12 in fluid communication with port 12b. A variable capacitor 14 having a substrate portion 14a and a flexible diaphragm portion 14b attached to the substrate in spaced apart sealed relation, is received in chamber 12e with diaphragm portion 14b exposed to the fluid pressure chamber. A suitable gasket 16 is placed between capacitor 14 and the bottom wall 12f of chamber 12e to provide a fluid seal. A ring 18 of polytetrafluoroethylene or the like, particularly useful in high pressure applications, may be placed between the sidewall 12g and gasket 16 to serve as a seating stop for capacitor 14 in cooperation with a downward force exerted through connector 20 clamped by inwardly bent wall portion 12h to be discussed and to prevent extrusion of the gasket between the capacitor and sidewall 12g.

An electrically insulative connector 20 has an end 20a received in the open end formed by sidewall 12g. End 20a is formed with a radially extending circumferential flange 20b so that attenuated distal end wall portion 12h of the housing can be deformed inwardly to clampingly engage the connector.

Preferably, a suitable gasket 22 is placed between distal end wall portion 12h and the connector for providing an environmental seal. Connector 20 mounts, as by insert molding, a plurality of connector terminals 24 which extend from a location within a shroud 20c into a recessed electric circuit chamber 20d for electrical connection with signal conditioning circuit 26. Signal conditioning circuitry of the type used is disclosed in U.S. Pat. No. 4,982,351, the subject matter of which is incorporated herein by this reference, and to which reference may be had for description of the operation of the circuitry.

Figure 3:
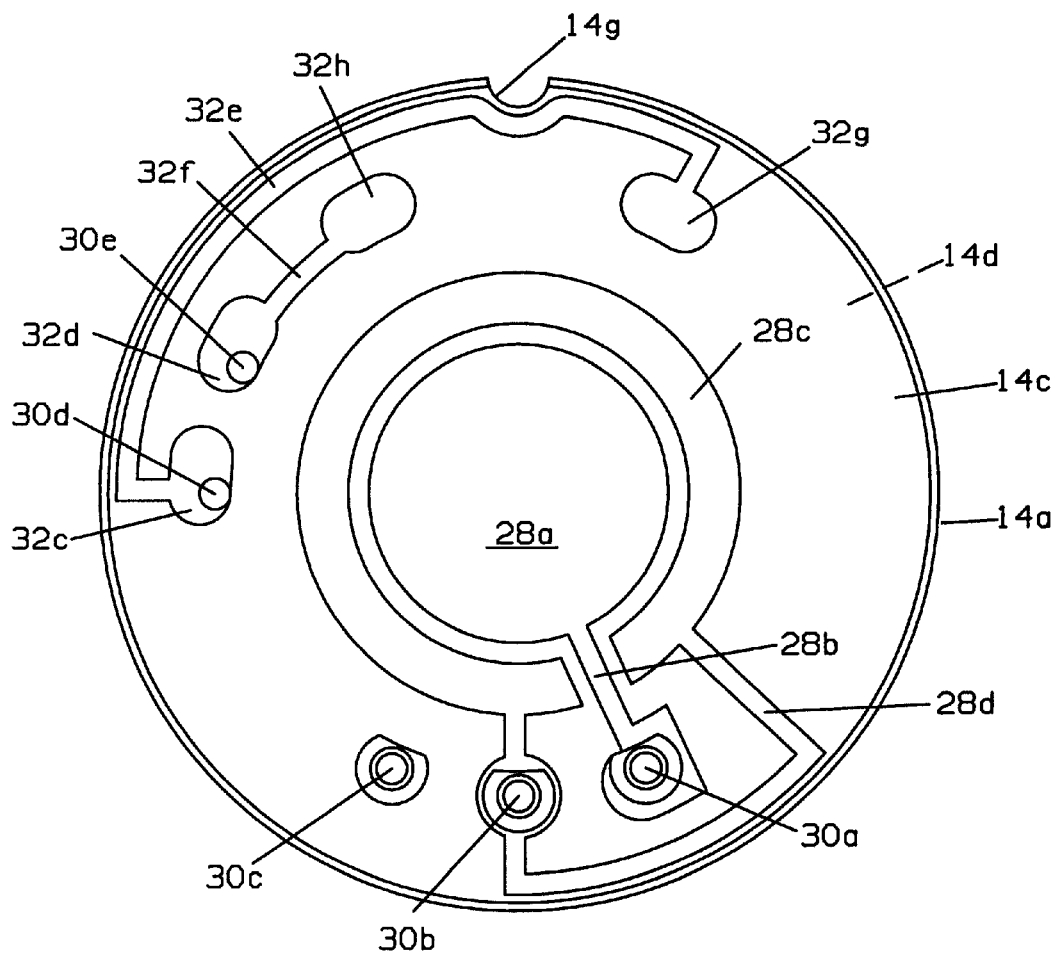
FIG. 3 is an enlarged bottom plan view of the substrate of the FIG. 2 capacitor shown with the stationary capacitor plate and guard ring of the capacitor along with associated electrical traces including temperature sensor interconnection traces.
Figure 4:
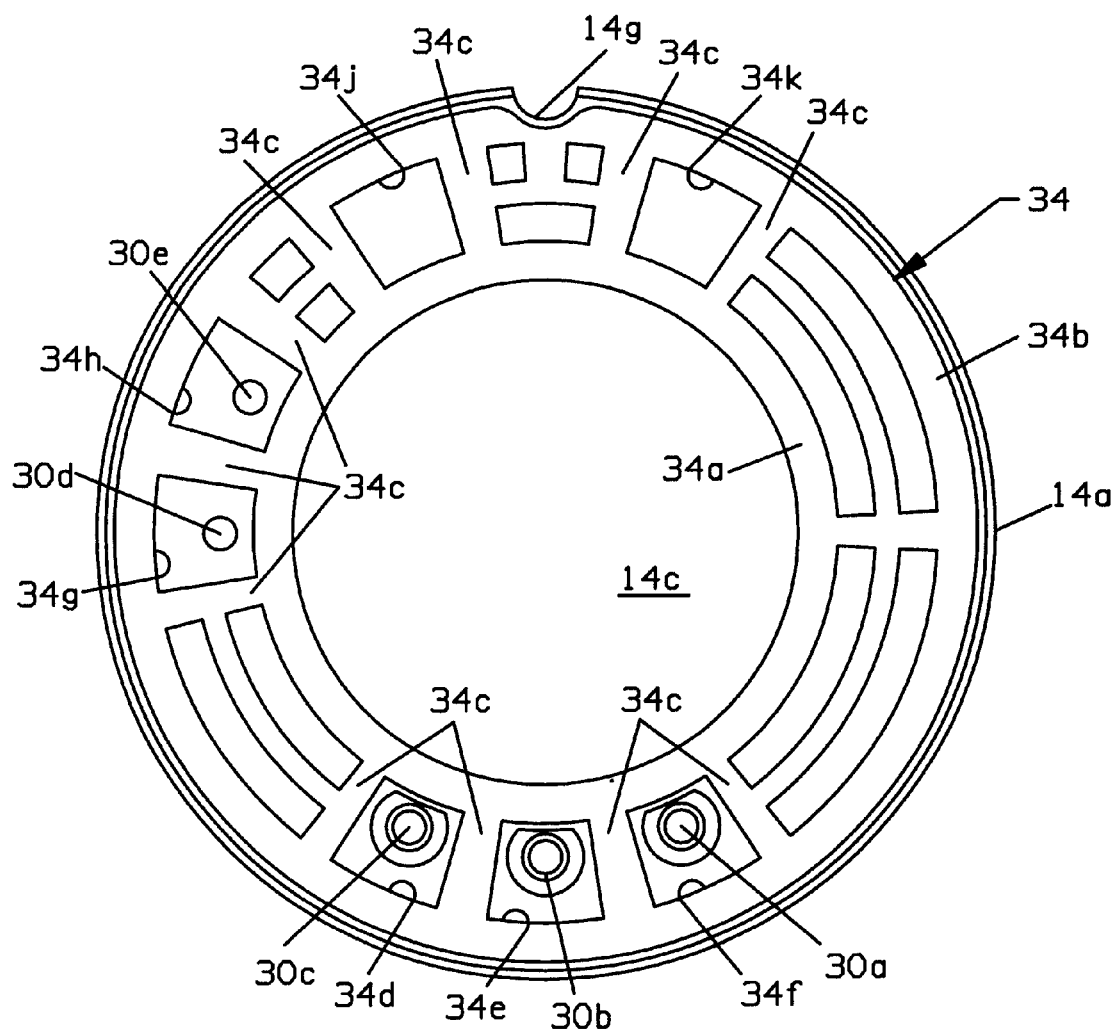
FIG. 4 is a view similar to FIG. 3 but shown without the electrically conductive plate, ring and traces and shown with the annular glass seal which is used to attach the diaphragm to the substrate in spaced apart relation therewith.

With particular reference to FIGS. 3 and 4, substrate 14a is a generally circular, rigid, disc shaped member formed of suitable electrically insulative material, such as ceramic, having opposed planar face surfaces 14c, 14d. A stationary capacitor plate 28a of suitable electrically conductive material is centrally disposed on face surface 14c with a conductive trace 28b extending Is radially outwardly to an electric pin 30a. A conventional guard ring 28c of electrically conductive material is also disposed on face surface 14c essentially surrounding plate 28a with an electrically conductive trace 28d connecting the ring to an electric pin 30b. Pins 30a, 30b, along with pin 30c to be discussed below, are mounted in bores provided through substrate 14a and are electrically connected to respective electrically conductive traces by means of conductive epoxy or the like, in a known manner.

Two additional electric pins 30d, 30e, extend through bores in substrate 14a and are electrically connected by means of conductive epoxy or the like to respective connector pads 32c, 32d, which in turn are connected respectively to conductive traces 32e, 32f, and they in turn are respectively connected to connection pads 32g, 32h. Pins 30d, 30e are aligned respectively with enclosed windows 34g, 34h and connection pads 32g and 32h are respectively aligned with windows 34k, 34j.

Figure 6:
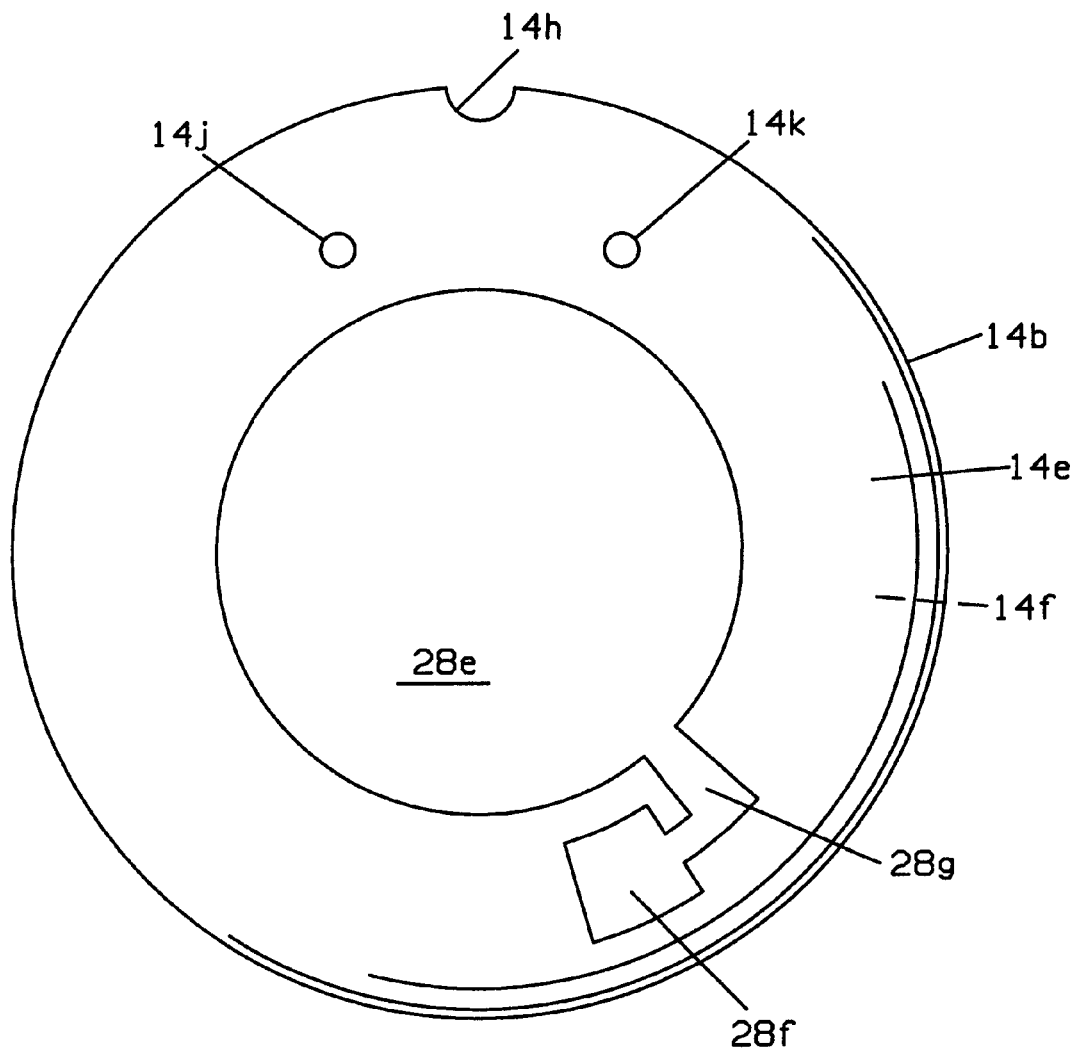
FIG. 6 is an enlarged top plan view of the diaphragm of the FIG. 2 capacitor shown with the movable capacitor plate disposed thereon.

Flexible diaphragm 14b, FIG. 6, also a generally circular member preferably formed of the same material as substrate 14a and having a matching outer periphery, has opposed planar face surfaces 14e, 14f with an electrically conductive capacitive plate 28e centrally disposed on face surface 14e and connected with electrically conductive joiner pad 28f through trace 28g. When diaphragm 14b is attached to substrate 14a, using for alignment registration notch 14g of substrate 14a and 14h of diaphragm 14b, with face 14e of diaphragm 14b facing face 14c of substrate 14a, pad 28f will be in alignment with lo pin 30c for electrical connection using conductive epoxy or the like. First and second apertures 14j, 14k, are formed through diaphragm 14b adjacent to the outer periphery at a location which corresponds to the windows 34k, 34j, respectively of the glass sealing and securing means 34 to be discussed.

Figure 5:
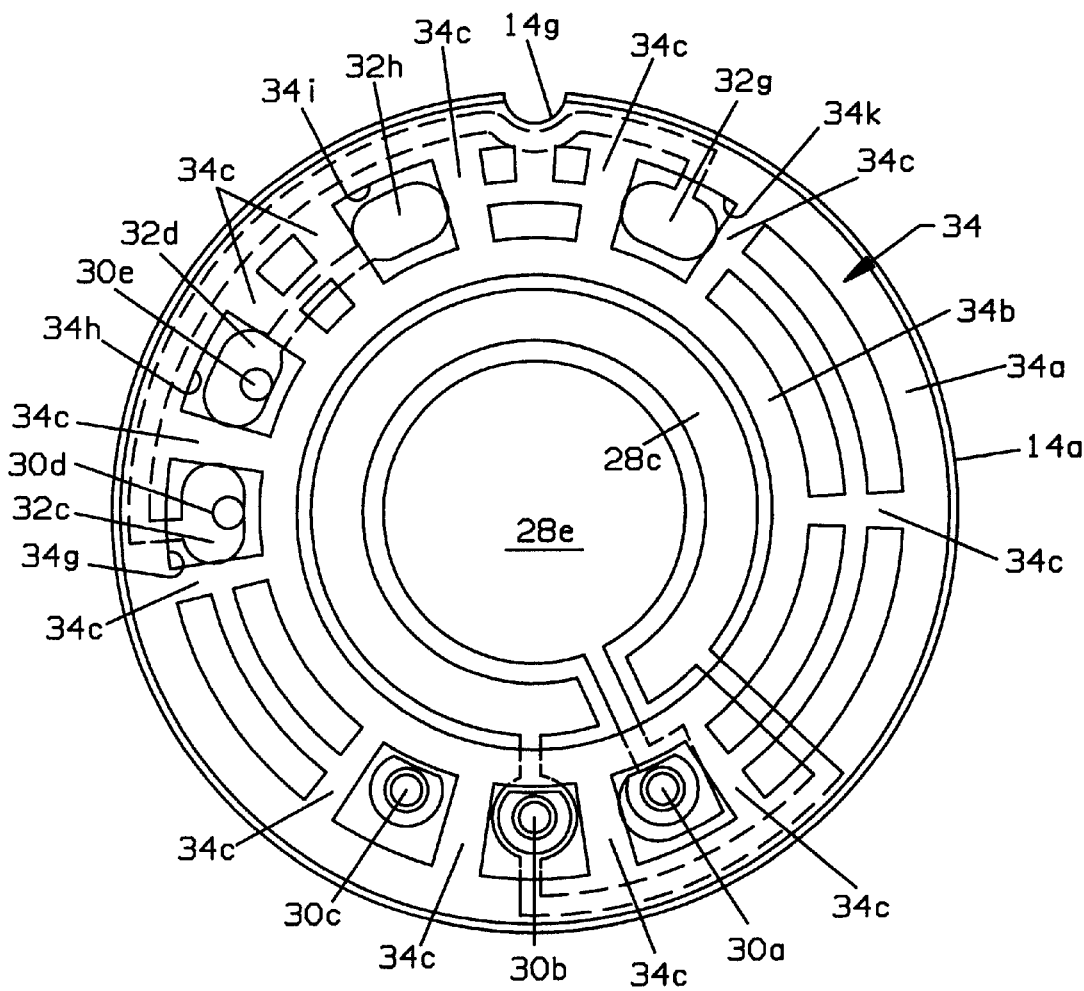
FIG. 5 is a bottom plan view of the FIG. 2 substrate shown with the FIG. 3 conductive layers and traces and with the FIG. 5 glass seal pattern.

With reference to FIG. 4, which shows glass frit pattern 34 on substrate 14a, with the various electrically conductive layers removed for the sake of illustration, and FIG. 5 which shows both the conductive layers and traces and the glass seal pattern, inner and outer ring portions 34a, 34b, of the glass seal pattern circumscribe the substrate on face 14c and are connected by generally radially extending fingers 34c forming a plurality of enclosed windows within the glass pattern including windows 34d, 34e, 34f, 34g, 34h, 34j and 34k.

Figure 2:
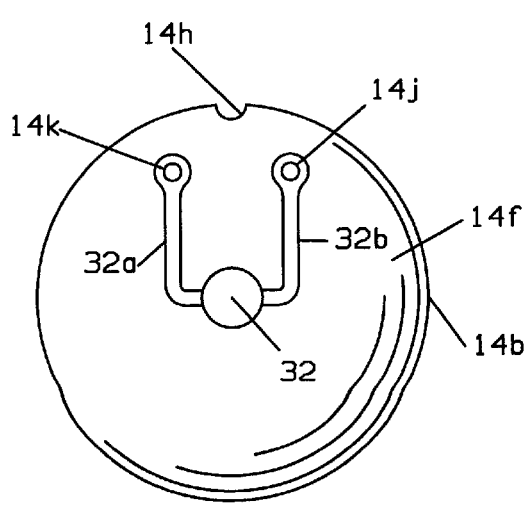
FIG. 2 is a bottom plan view of a variable capacitor of the FIG. 1 device showing a temperature responsive element mounted thereon.

A shown in FIGS. 1, 2 a temperature responsive resistive element, for example, a thick film layer 32 of suitable material such as platinum is disposed on face 14f of diaphragm 14b and is provided with electrically conductive traces 32a, 32b respectively, connected to spaced apart portions of layer 32 which extend to apertures 14k, 14j, respectively. Traces 32a, 32b, are electrically connected to connection pads 32h, 32g respectively, as by use of conductive epoxy, via fill or pins, to complete an electrical path between electric pins 30d, 30e through traces 32e, 32f, 32a, 32b and thermistor film 32. Traces 32e, 32f each extend from one glass enclosed window through a glass seal to another glass enclosed window. The windows aligned with apertures 14j, 14k are exposed to the fluid medium being monitored and are hermetically sealed from the windows aligned with pins 30d, 30e which extend into the electric circuit chamber. As stated above, the signal conditioning circuitry 26 conditions the electric signal from the thermistor to provide an output in a known manner.

A device made in accordance with FIGS. 1–6 combines a temperature sensing function having an effective glass seal for the temperature sensing element with a pressure sensing function which does not affect the pressure sensing function and which can be used with fluid pressures ranging from a few psi up to 4000 psi or higher.

In the following alternative embodiments shown in FIGS. 7–11, the pressure transducer is the same as that described in FIGS. 1–6 and therefore the description of that portion need not be repeated. With regard to FIG. 7, an alternate embodiment is shown comprising a combined pressure and temperature sensing device 40 in which the temperature sensing element is a disc shaped resistive thermistor element 42 with wire leads 42a, 42b attached to opposite face surfaces of element 42. The opposite ends 42c, 42d respectively, of wire leads 42a, 42b are received through apertures 14j, 14k of diaphragm 14b and preferably into closed ended bores 14m, 14n respectively of substrate 14a to provide mechanical support for the wire leads. Electrical connection to connection pads 32g, 32h is effected by means of conductive epoxy or the like. In the FIG. 7 embodiment, thermistor element 42 is completely surrounded by the fluid medium while still being protected from potential damage caused by handling during assembly, shipping or installing.

Figures 7, 8:
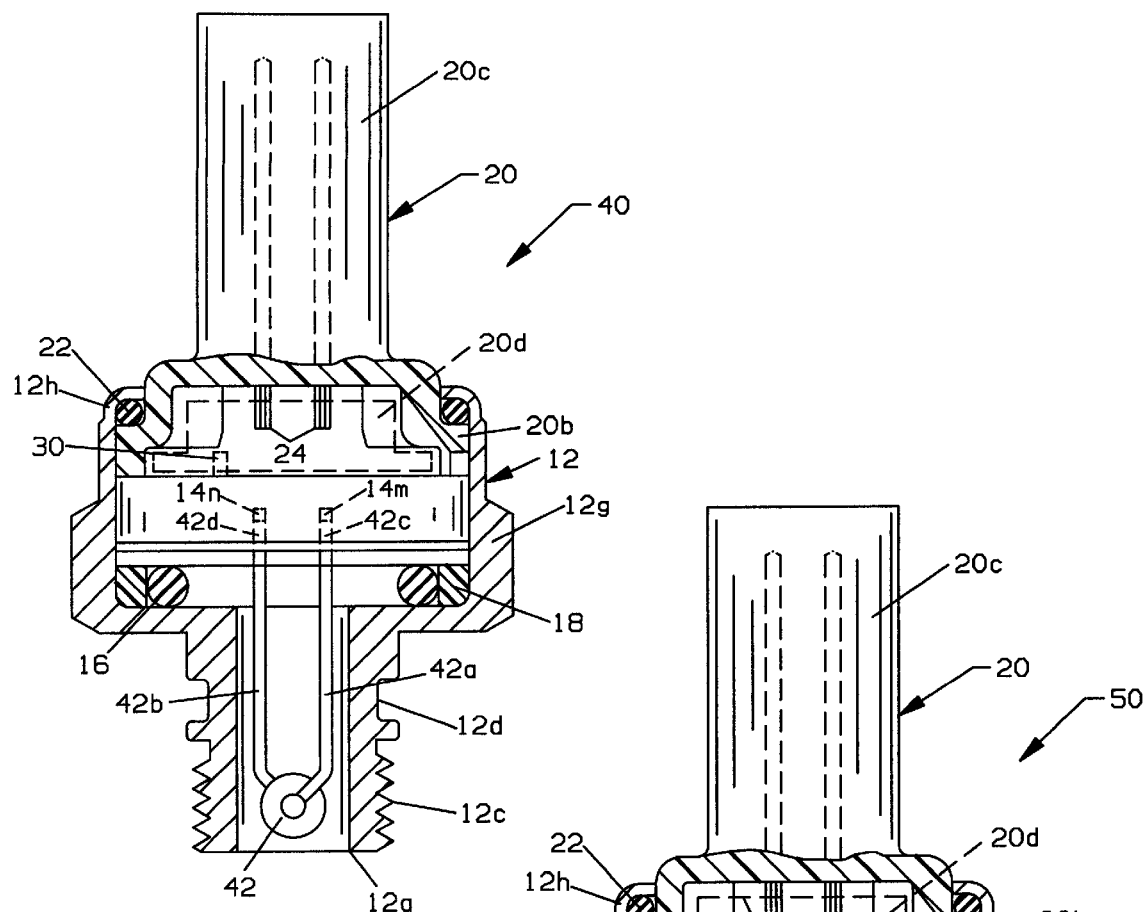
FIGS. 7–10 are views, similar to FIG. 1, of alternative embodiments of the invention.

FIG. 8 illustrates another embodiment in which the combined sensor device 50 is provided with a tubular guard 52 having a flange 52a received in fluid pressure chamber 12e and a castellated open end 52b. An annular land 52c provides a stop surface for capacitor 14 and defines the effective space for fluid chamber 12e. Suitable gasket 16' is received between flange 52a and the sidewall of housing 12. Thermistor element 42 is disposed at the castellated end 52b for placement directly in a conduit or the like containing the fluid medium being monitored. Thermistor element 42 is the same as in the FIG. 7 embodiment and wire leads 42a', 42b' correspond to wire leads 42a, 42b except that they are extended in length.

Figure 9:
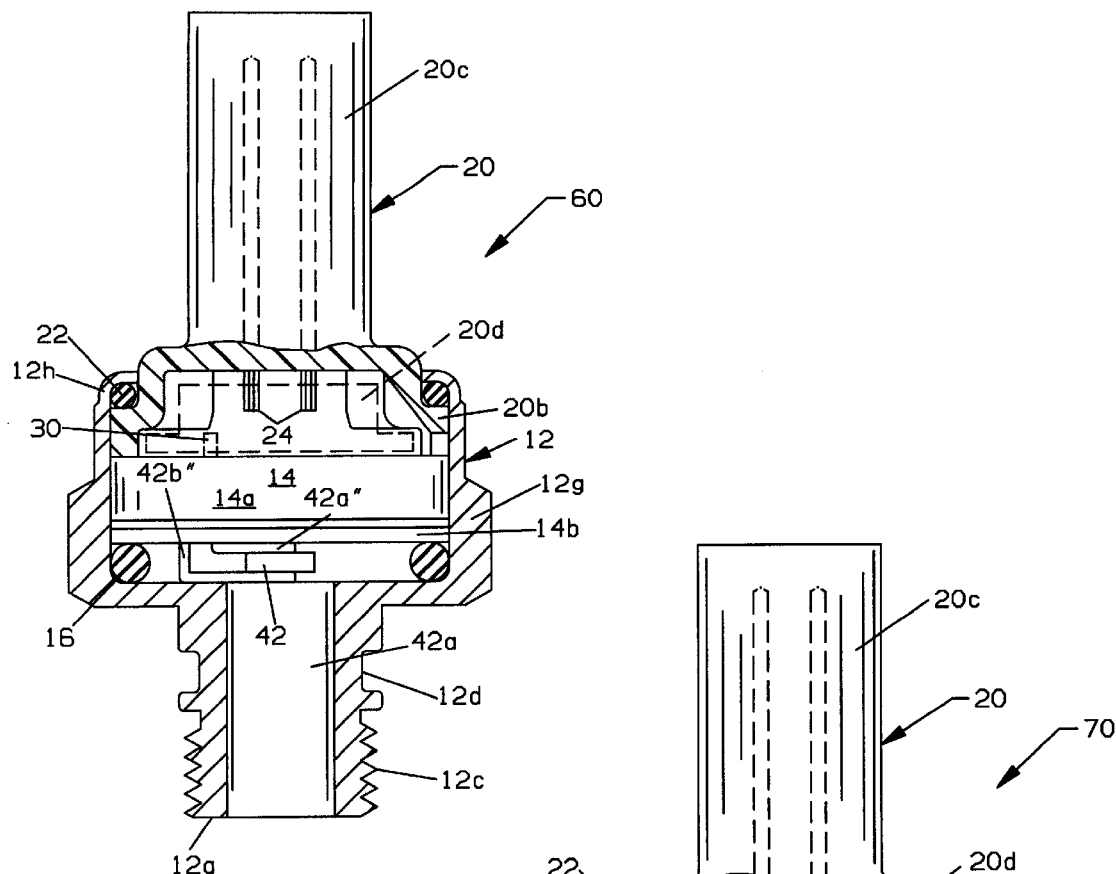

FIG. 9 illustrates another alternative embodiment in which the combined sensor device 60 includes wire leads 42a", 42b", corresponding to leads 42a, 42b of FIG. 7 but shortened, which are attached to thermistor element 42 and bent approximately 90 degrees so that thermistor element 42 is disposed closely adjacent diaphragm 14b.

Figure 10:
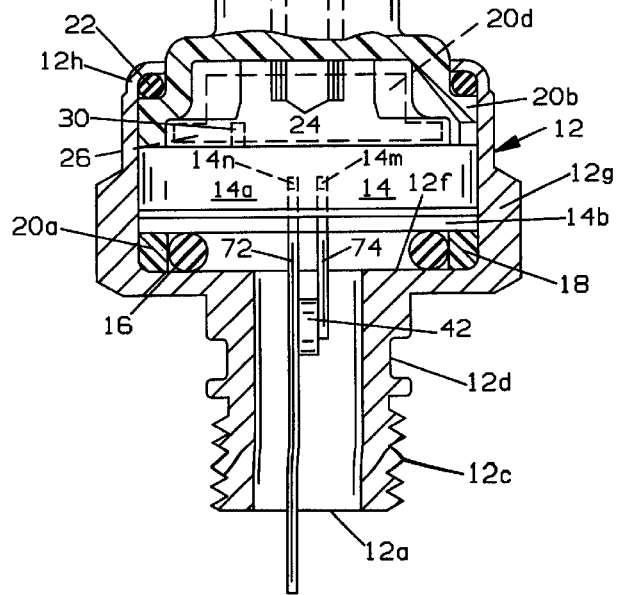

FIG. 10 illustrates an alternative embodiment in which the combined sensor device 70 comprises a thermistor element 42 thermally coupled with a heat conductive probe member 72 which extends beyond thermistor element 42 a selected distance, for example, as shown in the drawing beyond end 12a into the fluid medium. Probe member 72 is electrically attached to thermistor element 42 with a separate lead 74 or the like electrically attached to a spaced apart portion of the thermistor element 42. Lead 74 and probe member 72 are respectively attached to connection pads 32g, 32h in the same manner as in the FIGS. 7–9 embodiments. The FIG. 10 embodiment provides an advantage of minimizing any pendulum effect associated with the sensor element if it were mounted at the distal end of the elongated probe element since a significant portion of the mass of the sensor is located proximate to the substrate mounting means while still providing a fast response time and minimal heat differential between the fluid medium being monitored and the thermistor element.

Figure 11:
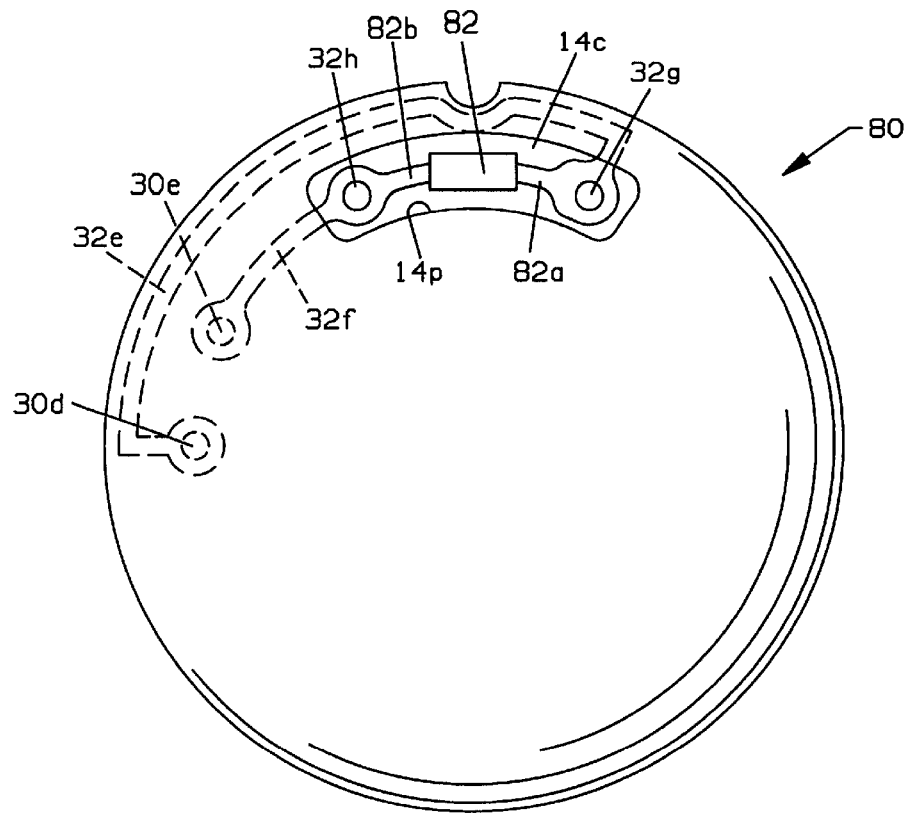
FIG. 11 is an enlarged bottom plan view of a variable capacitor mounting a temperature responsive element made in accordance with yet another embodiment of the invention.

FIG. 11, illustrating another alternative embodiment, a combined sensor 80, is shown without the housing and connector for simplicity of illustration. As shown, an aperture 14p is formed in the diaphragm 14 extending between connection pads 32h, 32g and thermistor element 82, either a surface mount element or a filmed element is placed directly on face 14c of substrate 14a.

Electric traces 82a, 82b electrically connect spaced apart portions of thermistor element 82 with connection pads 32g, 32h, respectively.

Figure 12:
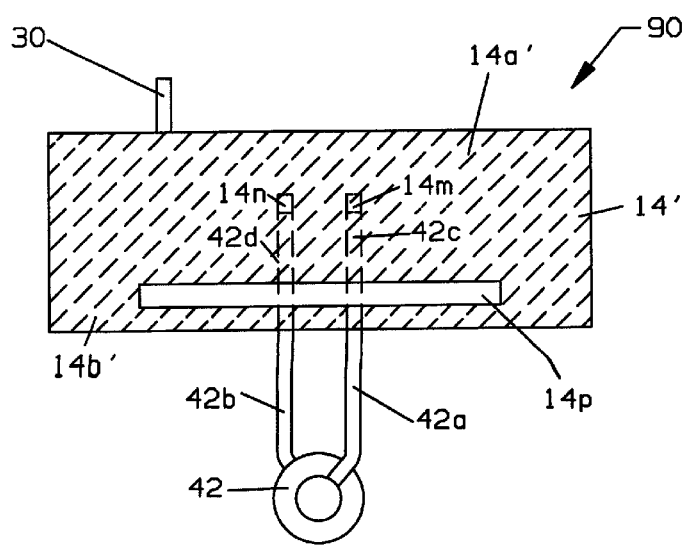
FIG. 12 is a cross sectional view of a variable capacitor mounting a temperature responsive element made in accordance with another embodiment of the invention.
Figure 13:
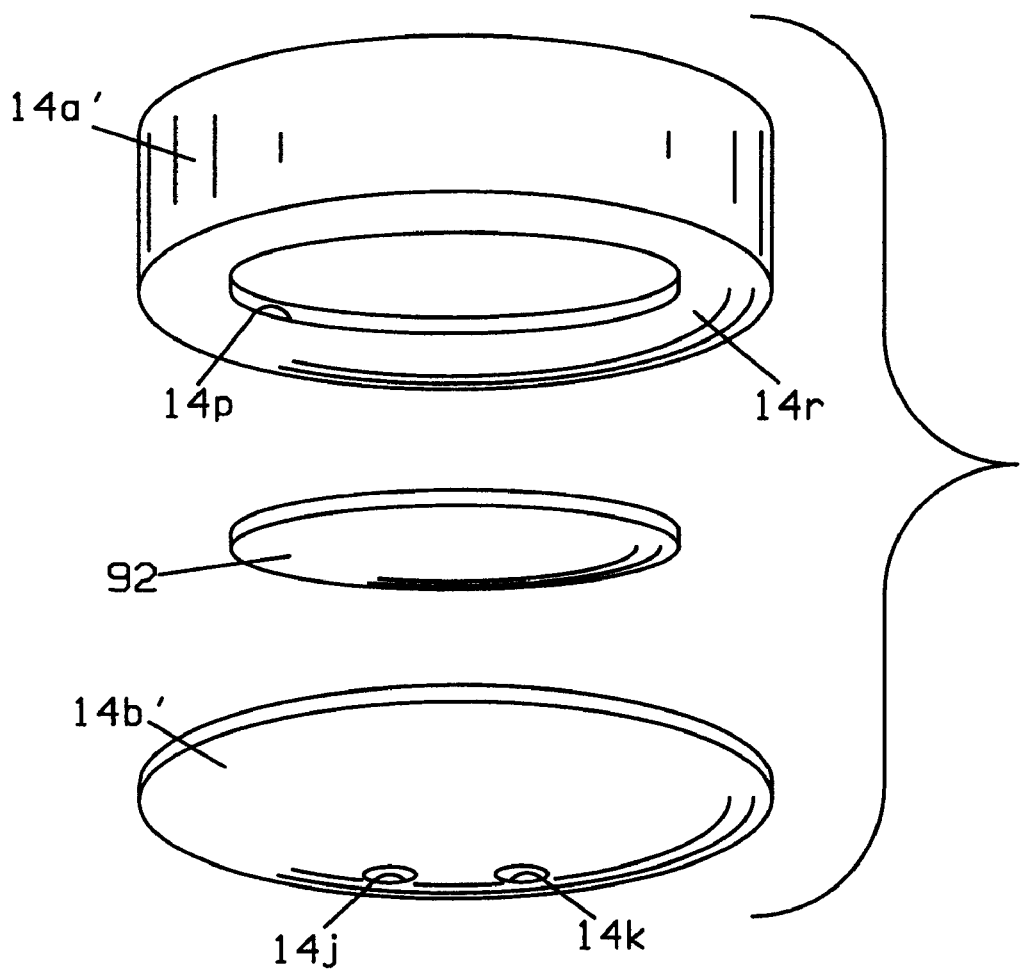
FIG. 13 is a blown apart perspective of parts used in making the FIG. 12 variable capacitor.

Although the above embodiments show a diaphragm secured in spaced apart relation to a separate substrate by an annular glass seal, it is also within the purview of the invention to combine a temperature sensor with a monolithic Is condition responsive sensor as shown in FIGS. 12 and 13.

With reference to FIG. 12, a combined sensor 90, also shown without the housing and connector for purposes of illustration, comprises a monolithic body 14' of suitable material, such as ceramic, having a cavity 14p formed between a substrate portion 14a' and a diaphragm portion 14b'. Monolithic body 14' can be formed, for example, by taking powdered ceramic material coated with an organic binder and pressed into substrate portion 14a' with a recess 14p and a diaphragm portion 14b' as shown in FIG. 13. A fugitive spacer element 92 of decomposable material may be placed in recess 14p to maintain the selected configuration of the recess. Metallized coatings such as the patterns of FIGS. 6 and 3, respectively, are deposited on the inner face surface of the diaphragm portion and on the recessed surface of the substrate portion 14a' with the connection pads pattern deposited on margin 14r between the outer periphery of the substrate portion and the recess 14p. The substrate and diaphragm portions are then pressed together to form a single unit and heated to a debinderizing temperature to decompose and release the organics and then the body is co-fired to sinter the ceramic and form a monolithic, closed cell body. Further details of making a monolithic pressure transducer are disclosed in U.S. Pat. No. 5,436,795, assigned to the assignee of the present invention, the subject matter of which is incorporated herein by this reference.

It should be understood that although preferred embodiments of the invention have been described by way of illustrating the invention, the invention includes all modifications and equivalents of the disclosed embodiments falling within the scope of the appended claims. Although a pressure responsive variable capacitor is disclosed as a specific condition responsive sensor combined with the temperature sensor, it will be understood that the temperature sensor can be combined with other condition responsive sensors having a diaphragm attached to a substrate by means of an annular seal or margin such as, for example, a pressure responsive strain resistive sensor or an acceleration sensor where the leads of the temperature sensor extend through the annular seal or margin as shown and described herein. Further, although glass is a preferred sealant and spacing material, other suitable sealing and spacing materials may be used, if desired. It will also be appreciated that in applications involving temperature sensing of an electrically conductive fluid that the thermistor and leads can be coated with a layer of electrically insulative material thick enough to provide electrical insulation but thin enough to avoid significantly affecting the thermal coupling between the fluid and the sensor.

We claim:

1. Combined fluid pressure and temperature sensor apparatus comprising
    a housing having first and second ends, a fluid pressure receiving port disposed at the first end, a fluid pressure receiving chamber formed in the housing with the port in fluid receiving communication therewith, a tubular wall formed at the second end of the housing forming an open end,
    a variable capacitor having a rigid electrically insulative substrate and opposing first and second relatively planar face surfaces and a generally circular outer periphery, a relatively flexible diaphragm formed of electrically insulative material having opposed first and second generally planar face surfaces and a generally circular outer periphery matching that of the substrate periphery, a capacitor plate disposed on the first face surface of each of the substrate and the diaphragm, the diaphragm disposed on the substrate with a generally annular glass seal therebetween disposed adjacent the peripheries of the substrate and the diaphragm, the capacitor plates being aligned and facing each other and being spaced apart by the glass seal to form a gap, the variable capacitor disposed in the housing with the second face surface of the diaphragm exposed to the fluid pressure receiving chamber,
    an electrically insulative connector body received in the open end of the housing, an electric circuit chamber formed between the connector body and the variable capacitor, a signal conditioning electric circuit received in the electric circuit chamber, electric terminals mounted in the connector body extending into the electric circuit chamber and being connected to the signal conditioning electric circuit, electric pins extending through the substrate aligned with the glass seal and having one end connected to the signal conditioning electric circuit, the other end of at least some electric pins electrically connected to the capacitor plates,
    a temperature responsive element, first and second electric leads electrically attached to spaced portions of the resistive element, the leads extending from a location external of the capacitor and being electrically connected to two other of the electric pins extending through the substrate.

2. Combined fluid pressure and temperature sensor apparatus according to claim 1 in which the temperature responsive element is disposed on the second face surface of the diaphragm and the electric leads include coated traces on the second face surface of the diaphragm.

3. Combined fluid pressure and temperature sensor apparatus according to claim 1 in which the electric leads comprise wire elements and the temperature responsive element is disposed in the port of the housing.

4. Combined fluid pressure and temperature sensor apparatus according to claim 1 in which the electric leads comprise wire elements and the temperature responsive element is disposed externally of the housing.

5. Combined fluid pressure and temperature sensor apparatus according to claim 1 in which the electric leads comprise elements bent approximately ninety degrees so that the temperature responsive element is disposed adjacent the second face surface of the diaphragm.

6. Combined fluid pressure and temperature sensor apparatus according to claim 1 further comprising an elongated heat conductive probe member having first and second opposite ends, the first end mounted in the substrate with the probe member extending through the diaphragm, the temperature responsive element mounted on the probe member.

7. Combined fluid pressure and temperature sensor apparatus according to claim 6 in which the temperature responsive element is mounted proximate to the second face surface on the diaphragm and the probe member extends beyond the temperature responsive element.

8. Combined fluid pressure and temperature sensor apparatus according to claim 1 in which first connection pads of electrically conductive material are disposed on the first face surface of the substrate within the glass seal and aligned with an aperture through the diaphragm, two electrically conductive second connection pads are disposed on the first face surface of the substrate spaced from the first connection pads, each second connection pad electrically connected to a respective first connection pad through the glass seal forming an hermetic seal between the first and second connection pads, the electric leads of the temperature responsive element being electrically connected to respective first connection pads and the second connection pads being electrically connected to respective electric pins extending through the substrate.

9. Combined fluid pressure and temperature sensor apparatus according to claim 8 in which the second connection pads are electrically connected to respective electric pins through electrically conductive epoxy.

10. Combined fluid pressure and temperature sensor apparatus according to claim 1 in which an aperture is formed in the diaphragm aligned with the annular glass seal and the temperature responsive element is mounted on the first face surface of the substrate.

11. Combined first and second condition responsive sensor apparatus comprising a first condition responsive sensor having a rigid electrically insulative substrate, a relatively flexible diaphragm formed of electrically insulative material, the diaphragm disposed on the substrate with a generally annular seal therebetween, electric pins extending through the substrate, at least some of the electric pins connected to the first condition responsive sensor,
    the second condition responsive sensor comprising a temperature responsive resistive element, first and second electric leads electrically attached to spaced portions of the resistive element, the leads extending from a location externally of the first condition responsive sensor through the diaphragm, two first connection pads of electrically conductive material disposed on a face surface of the substrate within the seal and aligned with an aperture through the diaphragm, two electrically conductive second connection pads disposed on the face surface of the substrate spaced from the first connection pads, each second connection pad electrically connected to a respective first connection pad through the seal forming a seal between the first and second connection pads, the electric leads of the temperature responsive resistive element being electrically connected to respective first connection pads and the second connection pads electrically connected to other respective electric pins extending through the substrate.

12. Combined first and second condition responsive sensor apparatus according to claim 11 in which the first condition responsive sensor comprises a pressure responsive variable capacitor.

13. Combined pressure responsive transducer and temperature sensor comprising a housing having first and second ends, a fluid pressure receiving port disposed at the first end, a fluid pressure receiving chamber formed in the housing with the port in fluid receiving communication therewith, a tubular wall formed at the second end of the housing forming an open end, a pressure sensor having a generally circular outer periphery the pressure sensor having a substrate and, a relatively flexible diaphragm formed of electrically insulative material, the diaphragm disposed on the substrate with a generally annular glass seal therebetween disposed adjacent the peripheries of the substrate and the diaphragm, the pressure sensor disposed in the housing with a face surface of the diaphragm exposed to the fluid pressure receiving chamber, an electrically insulative connector body received in the open end of the housing, an electric circuit chamber formed between the connector body and the substrate, a signal conditioning electric circuit received in the electric circuit chamber, electric terminals mounted in the connector body extending into the electric circuit chamber and being connected to the signal conditioning electric circuit, electric pins extending through the substrate aligned with the glass seal and having one end connected to the signal conditioning electric circuit, the other end of at least some electric pins electrically connected to the pressure sensor, a temperature responsive element, first and second electric leads electrically attached to spaced portions of the resistive element, the leads extending from a location external of the pressure sensor through the diaphragm and being electrically connected to other respective electric pins extending through the substrate.

14. Combined fluid pressure and temperature sensor apparatus according to claim 13 in which the temperature responsive element is disposed on the face surface of the diaphragm and the electric leads include coated traces on the face surface of the diaphragm.

15. Combined fluid pressure and temperature sensor apparatus according to claim 13 in which the electric leads comprise elements received in closed ended bores formed in the substrate.

16. Combined fluid pressure and temperature sensor apparatus according to claim 13 in which the electric leads comprise wire elements bent approximately 90 degrees so that the temperature responsive element is disposed adjacent the face surface of the diaphragm.

17. Combined fluid pressure and temperature sensor apparatus according to claim 13 further comprising an elongated heat conductive probe member having first and second opposite ends, the first end mounted in the substrate with the probe member extending through the diaphragm, the temperature responsive element mounted on the probe member.

18. Combined fluid pressure responsive transducer and temperature sensor apparatus according to claim 17 in which the temperature responsive element is mounted proximate to the face surface on the diaphragm and the probe member extends beyond the temperature responsive element.

19. A combined fluid pressure responsive transducer and temperature sensor apparatus according to claim 13 in which two first connection pads of electrically conductive material are disposed on a face surface of the substrate within the glass seal and aligned with an aperture through the diaphragm, two electrically conductive second connection pads are disposed on the face surface of the substrate spaced from the first connection pads, each second connection pad electrically connected to a respective first connection pad through the glass seal forming an hermetic seal between the first and second connection pads, the electric leads of the temperature responsive element being formed of wire elements electrically connected to respective first connection pads and the second connection pads electrically connected to respective electric pins extending through the substrate.

20. Combined pressure and temperature sensor apparatus according to claim 19 in which the electric leads comprise wire elements soldered to the first connection pads.

21. Combined fluid pressure and temperature sensor apparatus according to claim 19 in which an aperture is formed in the diaphragm aligned with the annular glass seal and the temperature resistive element is mounted on the face surface of the substrate.

22. Combined first and second condition responsive sensor apparatus comprising a first condition responsive sensor having a body of ceramic material having an outer periphery and a top and a bottom face surface and having a closed cavity in the body adjacent to and separated from the bottom face surface by a relatively flexible diaphragm, electric pins extending through the top surface into the body, at least some of the electric pins aligned with an annular margin between the cavity and the outer periphery, at least some of the electric pins connected to the first condition responsive sensor, the second condition responsive sensor comprising a temperature responsive resistive element, first and second electric leads electrically attached to spaced portions of the resistive element, the leads extending from a location externally of the first condition responsive sensor through the bottom face surface aligned with the margin, two first connection pads electrically conductive material disposed within the body and within the margin and aligned with an aperture extending through the bottom face surface, two electrically conductive second connection pads disposed within the body spaced from the first connection pads, each second connection pad electrically connected to a respective first connected pad, the electric leads of the temperature responsive resistive element being electrically connected to respective first connection pads and the second connection pads electrically connected to other respective electric pins extending through the top face surface.

* * * * *